United States Patent [19]

Kirlin

[11] Patent Number: 5,012,751
[45] Date of Patent: May 7, 1991

[54] PROCESS AND APPARATUS FOR TREATING SOLID REFUSE

[75] Inventor: William M. Kirlin, Summerville, S.C.

[73] Assignee: Giant Resource Recovery Company, Inc., Harleyville, S.C.

[21] Appl. No.: 511,398

[22] Filed: Apr. 18, 1990

[51] Int. Cl.[5] ............................................... F23G 5/00
[52] U.S. Cl. .................................... 110/346; 110/229; 110/236; 110/246; 432/14; 432/105; 432/106
[58] Field of Search ............... 110/226, 236, 246, 229, 110/346; 432/14, 72, 105, 106

[56] References Cited

U.S. PATENT DOCUMENTS 4,571,175  2/1986  Bogle et al.
4,797,091  1/1989  Neumann .................. 110/226 X
4,815,398  3/1989  Keating, II et al. ............. 110/236 X

OTHER PUBLICATIONS

"Garbage In, Garbage Out", Forbes, Jan. 8, 1990.
Walsh, "America Frets: Everyone Is Good at Playing Economic Leapfrog", The Boston Sunday Globe, Nov. 19, 1989, at p. A101, column 1.

Primary Examiner—Edward G. Favors
Attorney, Agent, or Firm—Dann, Dorfman, Herrell & Skillman

[57] ABSTRACT

A method and furnace assembly for treating solid refuse. The refuse comprises both recoverable materials useful either in cement or in construction and contaminants. The contaminants have a vaporization temperature lower than the vaporization or sublimation temperatures of the recoverable materials. The furnace assembly comprises a resource recovery furnace connected to a cement manufacturing furnace. According to the method, the refuse is transferred through a resource recovery furnace. Inside the resource recovery furnace the refuse is separated into vaporized contaminants and recoverable materials. Gas carrying the vaporized contaminants is transferred to the cement manufacturing furnace and used as an energy source. The recoverable materials are used in the cement manufacturing furnace as a constituent for making cement.

10 Claims, 1 Drawing Sheet

PROCESS AND APPARATUS FOR TREATING SOLID REFUSE

FIELD OF THE INVENTION

The present invention is directed to a process and furnace assembly for treating solid refuse and has particular application to the treatment of polluted soils and industrial wastes so that treated soils and industrial wastes may be used as raw materials in the manufacture of cement.

BACKGROUND OF THE INVENTION

The most common current methods of handling polluted soils and industrial wastes are sewage treatment plants and landfills. These current methods focus on making the soils and wastes environmentally safe. Yet both landfills and sewage treatment facilities have problems. Landfills and treatment facilities are very expensive and generally have serious limitations regarding the handling of toxic wastes. In addition, many communities are placing space limitations and other restrictions on landfills and sewage treatment plants. As the adverse environmental effects of pollutants are recognized, safety regulations are more stringently limiting treatment plants and landfills from permitting the further accumulation of polluted soils and industrial wastes without treatment.

The present invention contemplates treating solid refuse such as polluted soils and industrial wastes to obtain useful materials which need not be disposed of in landfills and treatment plants. The products of the treatment may be used as materials for making cement, or materials for use with cement and materials for use in construction.

The manufacture of cement requires large quantities of low cost raw materials. For economic reasons, cement plants need raw materials that are located nearby. But some cement plants are running out of traditional sources of readily-available and conveniently-located raw materials.

Sand, clay and other minerals in soils are used as raw materials in the manufacture of cement. Sand is also used with cement as an aggregate to make mortar or concrete. In addition, soil free of impurities is used with portland cement as a base for roads.

The present invention enables traditional sources of raw materials to be replaced by raw materials obtained from soils polluted from contact with gasoline or other chemicals. Another potential source of replacement raw materials is industrial waste. Suitable industrial wastes include used filter cake and deionization and demineralization resins.

SUMMARY OF THE INVENTION

It is an object of the present invention to convert polluted soils into materials useful as raw materials for cement or in construction.

It is a further object to treat industrial wastes in the same manner as polluted soils. Henceforth, the materials capable of being used as raw material for cement or in construction will be referred to as "recoverable materials". The contaminants in the polluted soil and industrial waste referred to directly above will collectively be referred to as "the contaminants". Such contaminants vaporize and/or combust at the aforesaid firing temperatures.

It is a further object of the invention to use the contaminants as an energy source in cement manufacturing.

It is yet a further object of the invention to enable decomposition of the contaminants into an environmentally safe off gas.

In accordance with the present invention, substantially solid refuse such as the aforementioned polluted soils and industrial wastes are fed into one end of a resource recovery furnace. Henceforth the refuse inserted into the resource recovery furnace will be referred to as the "starting material". The starting material is caused to move toward the opposite end of said furnace. While inside the resource recovery furnace, the starting material is in contact with hot gases which causes the temperature of the starting material to rise. In this manner, the starting material is heated to a maximum temperature that is above the vaporization temperatures of the contaminants, and below the vaporization or sublimation temperatures of the recoverable material. As the temperature of the starting material rises to this maximum temperature, the contaminants in the starting material are vaporized and entrained in the hot gases emanating from the recovery furnace. The solids remaining are the recoverable material which are cooled and removed from the resource recovery furnace for use as raw material in cement or in construction.

The vaporized contaminants are transferred from the resource recovery furnace to a cement kiln or cement manufacturing furnace. The recoverable materials may also be introduced as raw materials into the cement kiln. The hot gases containing the vaporized contaminants are mixed with fuel and the resulting mixture is burned as an energy source during the manufacture of cement clinker in the kiln.

The cement manufacturing furnace operates at a temperature high enough to cause the burned vaporized contaminants to decompose into an environmentally safe off gas which may be discharged through the conventional flue gas pollution-control apparatus and/or salvaged for further use.

DESCRIPTION OF A PREFERRED EMBODIMENT

A preferred embodiment of the present process and apparatus will now be described in detail with reference to the figures.

The present invention contemplates using a wide variety of solid refuse as the starting material. "Solid" is defined to mean that the weight percent of solids in the refuse is greater than fifty percent. Polluted soils and industrial wastes are the prime target for treatment according to this invention.

Examples of solid refuse that may be treated by the invention are soils and ash that are polluted with gasoline, fuel oil, wood preservative chemicals, coal tars and aromatic solvents. Polluted soils are produced, for example, as a result of seepage of gasoline from underground tanks. Soils may also accumulate as sludge in the bottom of oil tanks. The present invention may use as a starting material, soils polluted by virtually any organic or inorganic substance if the substance can burn. Preferred starting materials produce heat when burned.

Examples of industrial wastes for use in the present invention are creosote, waste sludges from product manufacturing or waste treatment, filter cake from chemical manufacturing, used activated carbon and spent deionization or demineralization resins. In addition, toxic wastes such as P.C.B.'s or dioxin or soils contaminated with these toxic wastes may also be used as starting materials, with suitable safeguards to avoid cross-contamination during treatment. Furthermore, an industrial waste such as a volatile organic compound that when heated vaporizes completely may also be used in the invention. In its vapor phase, the volatile organic compound may be ignited and burned as an energy source in the cement manufacturing furnace.

There are a few types of solid refuse that cannot be treated by the present invention. For example, the starting material cannot include military ordnance or constituents that explode when heated. Also, solids having a high sodium or potassium content should not be used without pretreatment to eliminate those elements which adversely affect cement quality. In addition, the weight percentages of mercury, zinc, lead, arsenic, chromium and cadmium in the refuse must be limited. The amount of each of these last five named elements should be 0.1% or less by weight although the zinc content may be as high as 0.5% by weight.

Figure 1:
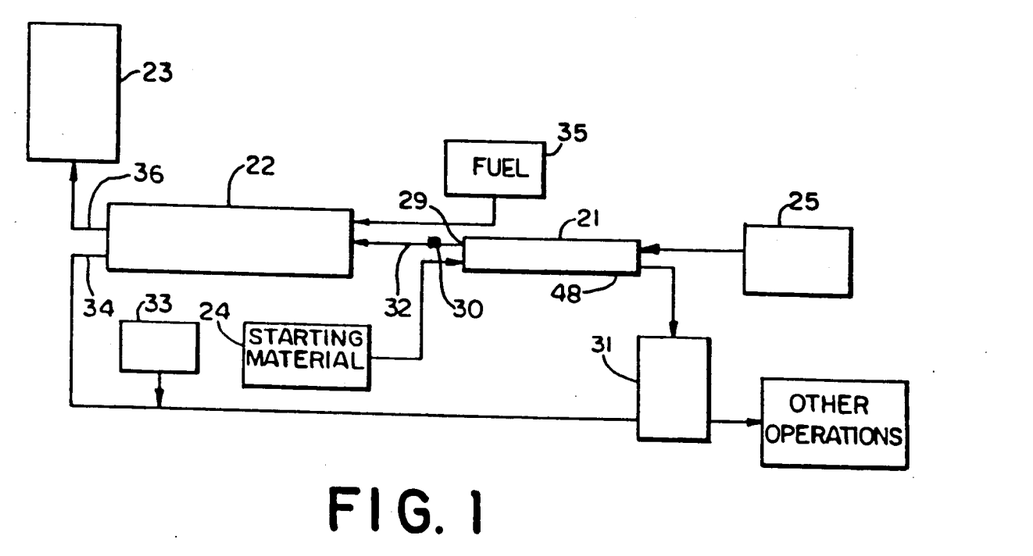
FIG. 1 is a schematic diagram showing the apparatus assembly employed in the preferred embodiment of the present invention.
Figure 2:
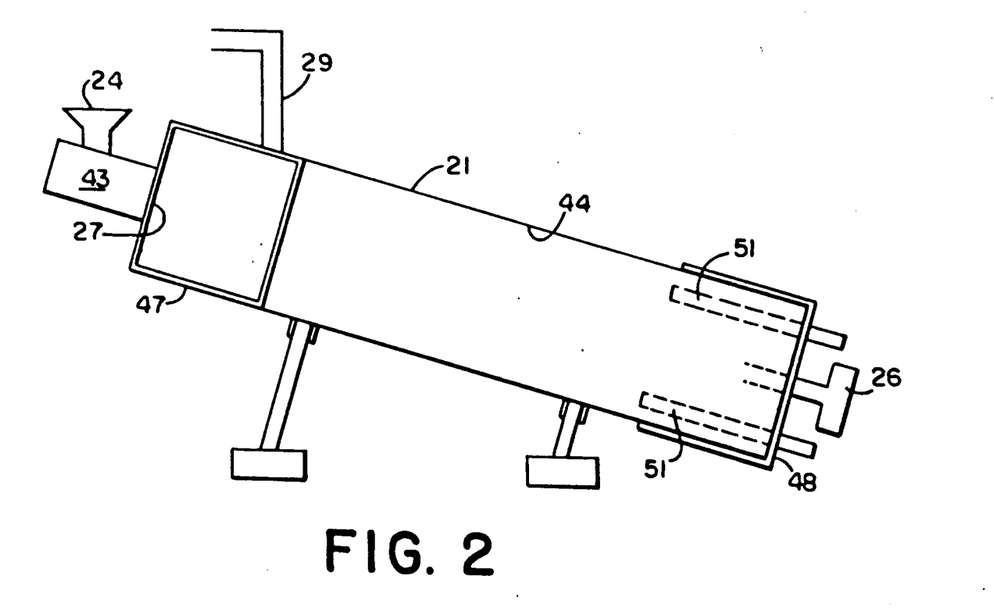
FIG. 2 is a schematic diagram showing a preferred form of part of the apparatus identified in FIG. 1.

As shown in FIGS. 1 and 2, the invention employs an apparatus assembly comprising a resource recovery furnace 21 connected to a cement manufacturing furnace or kiln 22. The assembly also includes an air pollution control device 23 for the cement manufacturing furnace. According to the invention, the solid refuse indicated at 24 is fed into one end 27 of the resource recovery furnace 21. Fuel 25 introduced into the other end at 26 is burned to generate hot gases for heating the contents of the furnace. The furnace heats the starting material to a temperature at which all of the contaminents are vaporized and exhausted with the off gas as indicated at 29, leaving only the recoverable materials in solid form. The recoverable materials are remove from the resource recovery furnace to a storage area 31. The vaporized contaminants in the off gas are transferred from the resource recovery furnace to the cement manufacturing furnace, for example, through a suitable conduit 32 connecting the two furnaces 21 and 22.

Raw material 33 along with material from the storage area 31 is also fed into the cement manufacturing furnace as indicated at 34. The vaporized contaminants are mixed with fuel introduced from a fuel supply 35 and burned in the cement manufacturing furnace or kiln 22 to heat that furnace to a temperature sufficient to transform the raw material introduced at 34 into cement clinker. Normally the temperature in the kiln 22 is in the range of 2,700° F.–3,000° F. In the high operating temperature of the kiln, the burned vaporized contaminants are decomposed into an environmentally safe off gas. Dust and gas produced during the cement manufacturing process are exhausted with the flue gases at 36 from the kiln 22 which are passed through the air pollution control device 23 before being discharged into the atmosphere.

As shown in FIG. 2, the starting material 24 is fed at one end of the resource recovery furnace 21 through an inlet 43. The inlet can be of any type that permits injection of the starting material into the resource recovery furnace.

Preferably, the resource recovery furnace, as shown in FIG. 2, has an elongated closed combustion chamber 44 which is elevated at the feed end 27. This elevation facilitates the movement of the starting material away from the feed end 27 to the opposite discharge end 48. The elongated combustion chamber preferably has internal flights and is rotated to facilitate the movement of the starting material. Alternatively or additionally, the resource recovery furnace may have other means for moving the starting material away from the feed end toward the discharge end.

As shown in FIG. 2, the resource recovery furnace has a hood 47 that covers the feed end 27 of the furnace. The hood 47 and the feed inlet 43 are designed to limit the introduction of air into the resource recovery furnace chamber 44. The present invention insures that only a controlled amount of oxygen will be allowed into the resource recovery furnace, so that the vaporized contaminants undergo only a partial combustion within the resource recovery furnace chamber 44. Vaporized contaminants subjected to only a partial combustion will serve as a better source of heat in the cement manufacturing furnace.

Inside the resource recovery furnace chamber 44, the solid-phase starting material is preferably contacted with heated gaseous phase constituents moving in the direction opposite to that of the starting material. By contacting the solids and the gases countercurrently, the maximum contact between the phases is assured. The gases in the resource recovery furnace are heated by a burner 26 located near the discharge end 48 of the furnace to serve as the heating unit. In one embodiment of the invention, the burner heats the gases to a maximum temperature of between about 1,600° F. and about 1,700° F. The maximum temperature may vary depending on the impurities within the starting material and the type of resource recovery furnace employed. The burner 26 may employ any fuel capable of generating sufficient heat and it has been found possible to effectively use spent treating agents such as waste oil and/or solvents that had been used in degreasing metal. Depending on the characteristics of the spent treating materials, their effectiveness as fuel may be enhanced by the addition of fresh oil or other additives.

As the starting material is moved away from the one end of the resource recovery furnace, the temperature of the starting material increases through contact with the heated combustion gases. As it progresses through the furnace, the temperature of the material in the furnace chamber 44 is raised to a maximum temperature that is above the vaporization temperature of the contaminants and below the vaporization or sublimation temperatures of the recoverable materials. In practicing the invention, this maximum temperature has been found to be about 1,200° F. Of course, this last referenced temperature depends upon the vaporization temperatures of the contaminants in the starting material being employed.

As the temperature of the material is increased, the contaminants are first liquified and then vaporized. The residual solids are the recoverable materials which are preferably cooled before removal through outlet end 48 to storage area 31. As shown in FIG. 2, heat exchangers 51 located next to the discharge end 48 of the furnace 44 cool the solid recoverable materials as the materials are removed from the resource recovery furnace chamber 44. The heat energy collected by heat exchangers 51 from the recoverable materials is used to preheat air supplied to the burner that is passed first through the heat exchangers. It has been found that economic savings are realized by preheating air to a temperature between about 500° F. and about 800° F.

The recoverable materials in the storage area 31 are sampled and analyzed to determine what materials are present. Certain materials are suitable for mixing with other constituents for feeding into the cement kiln 22 as indicated at 34. Other materials may be used in other operations. For example, the material may be classified or separated in the storage area 31, since the recoverable materials may range in size and composition from fine silts or clays to materials up to three inches in length. The fine silts or clays may be compacted and used for grading of sites which are being developed. Larger sized recoverable materials may also be used for grading and construction subgrade. Mixtures of these different sized recoverable materials may be used with portland cement as a base for roads. The larger sized recoverable materials may also be used as aggregate in concrete or as railroad ballast.

The vaporized contaminants are removed from kiln 21 by an induced draft fan 30 and are carried with the gas as shown in FIG. 1 from the resource recovery furnace into the cement manufacturing furnace 22 through the conduit 32. Within the cement manufacturing furnace 22, the vaporized contaminants are combined with the fuel 35 so that they may be burned to recover any useful heat energy that may be embodied in them as they are converted to pollution-free flue gas.

As shown in FIG. 1, raw materials at 33 and the recoverable materials at 31 are introduced together into the cement manufacturing furnace 22 to provide the constituents for making cement. The cement manufacturing furnace 22 comprises a closed chamber. As in a standard cement manufacturing process, the feed materials are ground to a fine powder and mixed intimately before being fed at 34 into the furnace 22. The fuel 35 and the vaporized contaminants from the conduit 32 are combined with combustion air and burned in the furnace 22 to heat the constituents of the cement during the cement manufacturing process. As in a standard cement furnace, the process transforms the constituents into cement clinker which is then turned into cement in the conventional manner.

During this cement manufacturing process, dust and gas produced from the cement manufacturing process are entrained in the flue gas resulting from the combustion of the combined contaminants and fuel which is passed through the air pollution control device 23. The high operating temperature of the furnaces causes the burned vaporized contaminants to be decomposed into an environmentally safe off gas consisting primarily of oxygen, nitrogen, carbon dioxide and water vapor. As a result, the burned vaporized contaminants need simple treatment to remove particulates and normal flue gas pollutants in the air pollution control device to be made environmentally safe. Useful components of the flue gas may be salvaged in the conventional way.

Before use, the starting material is sampled and analyzed for the elements contained therein and for the energy content in B.T.U.'s per pound. Starting material containing over 5,000 B.T.U.'s per pound such as creosote may release more energy than required and cause overheating of the resource recovery furnace. In these instances, the energy content of the starting material should be reduced to 5,000 B.T.U.'s per pound by adding sand or other diluting agents to the material.

EXAMPLE I

Samples were taken of soils and ballast contaminated with coal tar based creosote from four different sites from which refuse has been treated in the resource recovery furnace. The samples (henceforth referred to as Samples A through D) were dried at 100° F. in order to measure moisture content without otherwise affecting the samples. The results obtained are given in Table I.

TABLE I

| Sample | Moisture Content of Sample |
|---|---|
| A | 17.30% |
| B | 21.96% |
| C | 13.68% |
| D | 10.04% |

Each of the dried Samples A–D were leached with methylene dichloride ($MeCl_2$) in order to extract the creosote present. The creosote containing extracts were analyzed using a gas chromatograph (GC/MS). The GC/MS was calibrated to measure the total concentration of naphthalene, anthracene and pentachlorophenol present. The results of the GC/MS tests are given in Table II. The percentage of creosote in each dried sample is estimated to be equivalent to the total concentration of the naphthalene, anthracene and pentachlorophenol multiplied by the percentage of the sample extracted by methylene dichloride. The estimated percentages of creosote present in Samples A–D are also given in Table II.

TABLE II

| Sample | Amount of Dried Sample of Cresote in MeCl2 Extract | Total Concentration of Naphthalene, Anthracene and Pentachlorophenol in the Extract | Estimated Percentage of Creosote in Dried Sample |
|---|---|---|---|
| A | 7.97% | 22% | 1.75% |
| B | 10.34% | 5% | .52% |
| C | 1.23% | 11% | .14% |
| D | 7.18% | 10% | .72% |

EPA toxicity tests were also carried out on Samples A–D. The toxicity tests measured concentrations of specific metals, i.e. Arsenic (As), Silver (Ag), Cadmium (Cd), Chromium (Cr), Copper (Cu), Nickel (Ni), Lead (Pb), Zinc (Zn) and Mercury (Hg). The concentrations of the aforementioned metals in Samples A–D are given in Table IIIA and are within the limits for such metals that can be treated in the present invention.

TABLE IIIA

| | Concentrations (Parts Per Million) in dried soil samples A–D | | | | | | | | |
|---|---|---|---|---|---|---|---|---|---|
| Sample | As | Ag | Cd | Cr | Cu | Ni | Pb | Zn | Hg |
| A | 0 | .01 | 0 | .03 | .08 | .05 | .06 | .12 | 0 |
| B | 0 | .01 | 0 | .03 | .08 | .05 | .06 | .12 | 0 |
| C | 0 | .01 | .02 | .14 | .69 | .09 | .09 | 5.36 | 0 |
| D | 0 | 0 | .02 | .14 | .10 | .08 | .09 | 9.14 | 0 |

A similar methylene dichloride extraction test and EPA toxicity test were also carried out on samples of materials subsequently treated in a resource recovery kiln (henceforth identified as Samples E, F, G, H, J, K, L and M). No anthracene, naphthalene or pentachlorophenol was found in any of the last referenced samples. The metal concentrations obtained are given in Table IIIB and are within acceptable limits for the present invention.

TABLE IIIB

| | Metals | | | | | | | | | |
|---|---|---|---|---|---|---|---|---|---|---|
| | Ag | As | Cd | Cr | Cu | Hg | Ni | Pb | Se | Zn |
| | | | | | Units | | | | | |
| Samples | ppm | ppm | ppm | ppm | ppm | ppm | ppm | ppm | ppm | ppm |
| E | ND | ND | .1 | 4 | 3 | ND | .3 | 3 | ND | 10 |
| F | ND | ND | .1 | 4 | 3 | ND | .1 | ND | ND | 12 |
| G | ND | ND | .1 | 3 | 3 | ND | ND | ND | ND | 8 |
| H | ND | .030 | ND | ND | .03 | ND | ND | ND | ND | .130 |
| J | ND | .030 | ND | ND | ND | ND | ND | ND | ND | .015 |
| K | ND | .060 | .007 | ND | .02 | ND | ND | ND | ND | .855 |
| L | ND | .020 | ND | ND | ND | ND | ND | ND | ND | .240 |
| M | ND | .010 | ND | ND | ND | ND | ND | ND | ND | ND |

ND stands for none detected.

EXAMPLE II

Samples of three additional sources of creosote-containing refuse, all similar in composition to the types of refuse identified in Example I were measured for energy content in BTU's/pound. The test results obtained for the samples (henceforth referred to as Samples N, 0 and P) are given in Table IV below. Another sample (henceforth Sample Q) was taken from a refuse material that produces no heat energy when burned.

Refuse identified by Samples N, 0 and P was blended with stack dust containing no heat energy before treatment in the resource recovery furnace to avoid overheating of the furnace. The blend was 5 parts refuse to one part stack dust. The energy contents of the resulting blends and the composition of the stack dust are also given in Table IV.

TABLE IV

| Sample | B.T.U. of Refuse | Effective B.T.U. of Refuse/Stack Blend | Dust Stack Analysis | |
|---|---|---|---|---|
| N | 5299 | 4414 | SiO$_2$ | 11.8 |
| O | 4862 | 4050 | Al$_2$O | 5.4 |
| P | 4585 | 3819 | Fe$_2$O$_3$ | 1.9 |
| Q | 0 | 0 | CaO | 40.7 |
| | | | LOSS* | 26.4 |
| | | | TOTAL | 86.2 |

*Represents loss of carbon on ignition.

EXAMPLE III

Creosote-contaminated refuse similar in composition to the types of refuse identified in Examples I and II was treated in a resource recovery kiln and separated into recoverable material and vaporized contaminants. The kiln was monitored for the amount of refuse processed, the induced draft fan temperature and off gas temperature during two separate twenty-four hour periods. The results obtained area given in Tables VA and VB.

TABLE VA

| The Hour Within the 24 Hour Test Period | Temperature of Off Gas (in °F.) | Induced Draft Fan Temperature (in °F.) | Refuse Introduced Per Hour (in pounds) |
|---|---|---|---|
| 1 | 950 | 534 | 1,100 |
| 2 | 967 | 520 | 1,000 |
| 3 | 921 | 523 | 1,100 |
| 4 | 954 | 536 | 1,100 |
| 5 | Breakdown | — | 800 |
| 6 | Breakdown | — | — |
| 7 | Breakdown | — | — |
| 8 | Breakdown | — | — |
| 9 | Reheat | — | — |
| 10 | 940 | 546 | 600 |
| 11 | 921 | 529 | 800 |
| 12 | 935 | 540 | 1,000 |
| 13 | 892 | 520 | 1,000 |
| 14 | 943 | 534 | 1,000 |
| 15 | 947 | 528 | 900 |
| 16 | 959 | 526 | 800 |
| 17 | 925 | 518 | 800 |
| 18 | 954 | 537 | 800 |
| 19 | 888 | 501 | 800 |
| 20 | 887 | 500 | 800 |
| 21 | 900 | 502 | 800 |
| 22 | 904 | 510 | 900 |
| 23 | 917 | 532 | 1,000 |
| 24 | 946 | 537 | 1,100 |

TABLE VB

| The Hour Within the 24 Hour Test Period | Temperature of Off Gas (in °F.) | Induced Draft Fan Temperature (in °F.) | Refuse Introduced Per Hour (in pounds) |
|---|---|---|---|
| 1 | 881 | 493 | 600 |
| 2 | 875 | 499 | 600 |
| 3 | 870 | 487 | 600 |
| 4 | 875 | 488 | 600 |
| 5 | 898 | 487 | 600 |
| 6 | 886 | 488 | 600 |
| 7 | 878 | 490 | 600 |
| 8 | 957 | 522 | 600 |
| 9 | 952 | 529 | 700 |
| 10 | 901 | 501 | 700 |
| 11 | 932 | 516 | 700 |
| 12 | 945 | 520 | 700 |
| 13 | 952 | 522 | 700 |
| 14 | 968 | 513 | 700 |
| 15 | 953 | 517 | 700 |
| 16 | 943 | 507 | 700 |
| 17 | 932 | 505 | 700 |
| 18 | 950 | 510 | 700 |
| 19 | 908 | 468 | 700 |
| 20 | 1,021 | 501 | 700 |
| 21 | 934 | 495 | 700 |
| 22 | 941 | 464 | 700 |
| 23 | 823 | 444 | 700 |
| 24 | 857 | 445 | 700 |

In Table VA, the comment "Breakdown" refers to a period that the kiln was shut down to repair the conveyor line used to move refuse through the kiln.

EXAMPLE IV

Three sources of refuse that were similar in composition to the types of refuse identified in Examples I and II were treated in the resource recovery kiln. Samples of the recoverable materials obtained from the treatment (henceforth identified as Samples R, S and T) were analyzed using procedures described in Example I. The results from the analysis are given in Table VI and are expressed in weight percent.

TABLE IV

| Sample | $SiO_2$ | $Al_2O_3$ | $Fe_2O_3$ | CaO | $TiO_2$ | Loss * |
|---|---|---|---|---|---|---|
| R | 54.26 | 17.66 | 7.29 | 3.44 | 2.14 | 15.21 |
| S | 82.93 | 7.69 | 2.79 | 1.74 | 0.63 | 5.22 |
| T | 75.3 | —10.5 | 5.1 | 1.7 | N.M. | N.M. |

11.6–20.17 is the moisture range of input feed stock - all discharge moistures were 0%.
N.M. signifies Not Measured.
* represents loss of carbon on ignition

EXAMPLE V

A cement manufacturing kiln used in the invention was monitored for two separate twenty-four hour periods of operation. The results obtained are given in Tables VIIA and VIIB.

TABLE VIIA

| Time in Terms of The Hour Within 24 Hour Period | Temperature at Chain (in °F.) | Temperature at Backend (in °F.) | $O_2$ % | CO (p.p.m.) |
|---|---|---|---|---|
| 1 | 1,600 | 470 | 6.0 | 250 |
| 2 | 1,680 | 540 | 4.5 | 100 |
| 3 | 1,670 | 420 | 4.5 | 0 |
| 4 | 1,680 | 430 | 1.5 | 500 |
| 5 | 1,680 | 410 | 3.0 | 300 |
| 6 | 1,680 | 410 | 3.5 | 350 |
| 7 | 1,700 | 460 | 4.0 | 450 |
| 8 | 1,700 | 500 | 3.0 | 500 |
| 9 | 1,660 | 440 | 3.0 | 500 |
| 10 | 1,660 | 520 | 3.0 | 375 |
| 11 | 1,680 | 460 | 2.5 | 375 |
| 12 | 1,660 | 470 | 2.5 | 350 |
| 13 | 1,650 | 440 | 3.0 | 325 |
| 14 | 1,620 | 440 | 3.0 | 325 |
| 15 | 1,620 | 440 | 2.5 | 300 |
| 16 | 1,640 | 440 | 2.0 | 300 |
| 17 | 1,650 | 430 | 3.0 | 300 |
| 18 | 1,700 | 430 | 2.0 | 300 |
| 19 | 1,710 | 455 | 1.5 | 300 |
| 20 | 1,700 | 430 | 2.0 | 250 |
| 21 | 1,680 | 430 | 2.5 | 300 |
| 22 | 1,630 | 400 | 2.5 | 300 |
| 23 | 1,560 | 390 | 5.0 | 200 |
| 24 | 1,680 | 600 | 2.0 | 300 |

TABLE VIIB

| Time in Terms of The Hour Within 24 Hour Period | Temperature at Chain (in °F.) | Temperature at Backend (in °F.) | $O_2$ % | CO (p.p.m.) |
|---|---|---|---|---|
| 1 | 1,600 | 530 | 6.5 | 200 |
| 2 | 1,700 | 550 | 5.0 | 200 |
| 3 | 1,700 | 510 | 7.5 | 250 |
| 4 | 1,700 | 560 | 7.5 | 300 |
| 5 | 1,670 | 510 | 6.5 | 300 |
| 6 | 1,670 | 530 | 7.5 | 350 |
| 7 | 1,670 | 530 | 7.0 | 350 |
| 8 | 1,680 | 540 | 7.0 | 350 |
| 9 | 1,680 | 540 | 8.0 | 350 |
| 10 | 1,660 | 550 | 7.5 | 350 |
| 11 | 1,660 | 530 | 7.0 | 300 |
| 12 | 1,660 | 540 | 6.5 | 325 |
| 13 | 1,660 | 550 | 5.5 | 350 |
| 14 | 1,650 | 550 | 6.5 | 350 |
| 15 | 1,670 | 610 | 8.5 | 325 |
| 16 | 1,690 | 620 | 5.5 | 500 |
| 17 | 1,680 | 550 | 5.0 | 500 |
| 18 | 1,700 | 650 | 5.0 | 400 |
| 19 | 1,660 | 480 | 4.0 | 410 |
| 20 | 1,620 | 450 | 4.0 | 410 |
| 21 | 1,600 | 430 | 6.0 | 200 |
| 22 | 1,660 | 440 | 6.0 | 300 |
| 23 | 1,680 | 460 | 6.0 | 200 |
| 24 | 1,640 | 430 | 2.0 | 200 |

EXAMPLE VI

A combination of 80% marl, 10% ash, 5% virgin sand and 5% recoverable material from which Sample T was taken was ground to a fine powder and mixed intimately. Water was added to form a slurry. Gas carrying vaporized contaminants that was discharged from the resource recovery furnace was mixed with fuel. The gas/fuel mixture was burned in the cement manufacturing furnace to heat the slurry and thereby transform the slurry into cement clinker. Samples of the slurry and clinker were each analyzed in the lab and compared with projected analyses. The results of these analyses are also given in Table VIII and are expressed in weight percent. As shown in Table VIII below, the cement clinker is primarily composed of tricalcium silicate (3 $CaO \cdot SiO_2$) and tricalcium aluminate (3 $CaO \cdot Al_2O_3$). Compared to the lab projections, the actual analysis measured a higher percentage of the ash present in the slurry and clinker which accounts for the relatively higher percentages of $Al_2O_3$ recorded in the furnace analysis. Referring again to Table VIII, the loss of ignition is due to the combustion of the carbon materials present.

TABLE VIII

| | COMPONENT ANALYSIS | | | | ANALYSIS OF SLURRY AND CLINKER | | | |
|---|---|---|---|---|---|---|---|---|
| | Marl | Ash | Virgin Sand | Sample T Material | Calculated Slurry | Actual Slurry | Calculated Clinker | Actual Clinker |
| $SiO_2$ | 1.4 | 44.6 | 93.5 | 75.3 | 14.0 | 13.6 | 21.7 | 21.4 |
| $Al_2O_3$ | .5 | 24.3 | 2.5 | 10.5 | 3.4 | 4.4 | 5.4 | 6.6 |
| $F_2O_3$ | .4 | 10.9 | 2.0 | 5.1 | 1.8 | 1.8 | 2.8 | 2.7 |
| CaO | 53.9 | 2.9 | — | 1.7 | 43.4 | 43.0 | 67.4 | 67.4 |
| LOSS* | 42.6 | 10.9 | 1.0 | 5.3 | 35.6 | 35.6 | — | — |
| TOTAL | 98.8 | 93.9 | 99.0 | 97.9 | 98.2 | 98.4 | 97.3 | 98.1 |

TABLE VIII-continued

| | COMPONENT ANALYSIS | | | ANALYSIS OF SLURRY AND CLINKER | | | |
|---|---|---|---|---|---|---|---|
| | Marl | Ash | Virgin Sand | Sample T Material | Calculated Slurry | Actual Slurry | Calculated Clinker | Actual Clinker |
| $C_3S$** | — | — | — | — | — | — | 69.2 | 61.6 |
| $C_3A$*** | — | — | — | — | — | — | 9.6 | 13.1 |

*represents the loss of carbon on ignition.
**$C_3S$ represents tricalcium silicate ($3CaO\ SiO_2$)
***$C_3A$ represents tricalcium aluminate ($3CaO\ Al_2O_3$)

EXAMPLE VII

A current manufacturing kiln used in the invention was tested for destruction removal efficiency which measures how completely a fuel mixture (including gas carrying vaporized contaminants) is burned in the kiln.

The test involves spiking the gas/fuel mixture with Freon before the mixture is burned in the kiln. The stack gas which contains any unburned residue of the mixture is tested for unburned Freon. Because of Freon's very high chemical stability, more Freon will remain unburned than any constituent of the fuel mixture.

The results for the seven test runs completed are given in Table IX. The results demonstrate that the destruction removal efficiency of the kiln is consistently greater than 99.99%.

TABLE IX

| Run No. | Pounds Freon/ Hour Burned | Flue Gas Concentration PPM | Pounds Freon Emitted/Hr | Destruction Removal Efficiency |
|---|---|---|---|---|
| 1-1 | 431.4 | <0.001 | <0.01 | >99.999 |
| 1-2 | 431.4 | <0.001 | <0.01 | >99.999 |
| 1-3 | 431.4 | 0.016 | 0.024 | 99.994 |
| 2-1 | 361.8 | — | — | — |
| 2-2 | 361.8 | — | — | — |
| 2-3 | 361.8 | 0.019 | 0.028 | 99.992 |
| 3-1 | 388.2 | 0.005 | 0.007 | 99.998 |
| 3-2 | 388.2 | 0.004 | 0.006 | 99.999 |
| 3-3 | 388.2 | 0.005 | 0.007 | 99.998 |

EXAMPLE VIII

A cement manufacturing kiln used in the invention was tested for efficiency in controlling emissions of particles into the atmosphere. The test results obtained are given in Table X and demonstrate that particle emissions are equivalent to less than 0.05 percent by weight of the product.

TABLE X

| Test No. | Production Rate lbs/hr | Emissions lbs/hr |
|---|---|---|
| 1 | 50,800 | 5.76 |
| 2 | 49,200 | 13.50 |
| 3 | 49,000 | 10.88 |
| Avg. | 49,800 | 10.05 |

EXAMPLE IX

Stack gas from a cement manufacturing kiln operated in accordance with the invention was analyzed over three separate one hour periods through a meter positioned within the stack. The results of the stack gas analyses are given in Tables XIA, XIB and XIC.

In Tables XIIA through XIIC, the stack gas is shown to consist of carbon dioxide, nitrogen, oxygen and water vapor. These stack gas results confirm the decomposition of the vaporized contaminants. The low temperatures of the stack gas being analyzed illustrates the efficiency of the kiln in utilizing the heat content of the gas.

TABLE XIA

| Item | Results | Units |
|---|---|---|
| $CO_2$ Concentration | 16,8000 | Percent |
| $O_2$ Concentration | 7,0000 | Percent |
| CO Concentration | N/A | Percent |
| $N_2$ Concentration | 75.2000 | Percent |
| Dry molecular weight of gas | 30.6880 | Pound/Pound-Mole |
| Total moisture collected | 458.5000 | Milliliters |
| Total moisture collected | 21.6412 | Standard Cubic Feet |
| Moisture content of stack gas | 27.3119 | Percent |
| Measured dry gas volume through meter | 59.7963 | Cubic Feet |
| Barometric pressure | 30.0600 | Inches of Mercury |
| Average gas temperature through meter | 95.5 | Degrees Fahrenheit |
| Dry gas volume through meter | 57.5962 | Standard Cubic Feet |
| Wet molecular weight of gas | 27.2227 | Pound/Pound-Mole |
| Average stack gas temperature | 356.5 | Degrees Fahrenheit |
| Stack gas volumetric flow rate | 108091. | ACFM (?) |
| Wet bulb stack gas temperature | 162.0 | Degrees Fahrenheit |
| Total particulate collected | 93.08 | Milligrams |
| Particulate concentration | 0.0249 | Grains per SCF |
| Particulate emmission rate | 10.6266 | Pounds per hour |
| Total sampling time | 60 | Minutes |

TABLE XIB

| Item | Results | Units |
|---|---|---|
| $CO_2$ concentration | 16.0000 | Percent |
| $O_2$ concentration | 8.0000 | Percent |
| CO concentration | 0.0000 | Percent |
| $N_2$ concentration | 76.0000 | Percent |
| Dry molecular weight of gas | 30.8800 | Pound/Pound-Mole |
| Total moisture collected | 265.0000 | Milliliters |
| Total moisture collected | 12.5080 | Standard Cubic Feet |
| Moisture content of stack gas | 28.3147 | Percent |
| Measured dry gas volume through meter | 32.6768 | Cubic Feet |
| Barometric pressure | 30.0100 | Inches of Mercury |
| Average gas temperature through meter | 87.6 | Degrees Fahrenheit |
| Dry gas volume through meter | 31.6670 | Standard Cubic Feet |
| Wet molecular weight of gas | 27.2331 | Pound/Pound-Mole |
| Average stack gas temperature | 352.5 | Degrees Fahrenheit |
| Stack gas volumetric flow rate | 116189 | ACFM |
| Wet bulb stack gas | 162.0 | Degrees |

TABLE XIB-continued

| Item | Results | Units |
|---|---|---|
| temperature | | Fahrenheit |
| Total particulates collected | 59.61 | Milligrams |
| Particulate concentration | 0.0290 | Grains per SCF |
| Particulate emission rate | 13.1646 | Pounds per Hour |
| Total sampling time | 60 | Minutes |

TABLE XIC

| Item | Results | Units |
|---|---|---|
| $CO_2$ concentration | 16.0000 | Percent |
| $O_2$ concentration | 8.0000 | Percent |
| CO concentration | N/A | Percent |
| $N_2$ concentration | 76.0000 | Percent |
| Dry molecular weight of gas | 30.8800 | Pound/Pound-Mole |
| Total moisture collected | 258.1000 | Standard Cubic Feet |
| Moisture content of stack gas | 27.8254 | Percent |
| Measured dry gas volume through meter | 31.9320 | Cubic Feet |
| Barometric pressure | 30.0100 | Inches of Mercury |
| Average gas temperature through meter | 76.6 | Degrees Fahrenheit |
| Dry gas volume through meter | 31.5990 | Standard Cubic Feet |
| Wet molecular weight of gas | 27.2961 | Pound/Pound-Mole |
| Average stack gas temperature | 345.7 | Degrees Fahrenheit |
| Stack gas volumetric flow rate | 111099. | ACFM |
| Wet bulb stack gas temperature | 162.0 | Degrees Fahrenheit |
| Total particulates collected | 26.14 | Milligrams |
| Particulate concentration | 0.0127 | Grains per SCF |
| Particulate emission rate | 5.6163 | Pounds Per Hour |
| Total sampling time | 60 | Minutes |

While the present invention has been described and exemplified above in terms of certain preferred embodiments, various other embodiments may be apparent to those skilled in the art. Accordingly, the invention is not limited to the embodiments specifically described and exemplified, but variations and modifications may be made therein and thereto without departing from the spirit of the invention, the full scope of which is delineated by the appended claims.

I claim:

1. In a furnace assembly comprising a resource recovery furnace connected to a cement manufacturing furnace, a method of treating solid refuse which includes polluted soils or ash, said refuse comprising both recoverable material having determinable vaporization or sublimation temperatures and useful in cement, and contaminants having vaporization temperatures lower than the vaporization or sublimation temperatures of the recoverable material, said method comprising the steps of:
    (a) introducing all of the solid refuse into one end of the resource recovery furnace and causing the refuse to move through the resource recovery furnace toward the other end;
    (b) as the refuse is moved, controlling the temperature of the refuse to above the vaporization temperatures of the contaminants and below the vaporization or sublimation temperature of the recoverable material in order to vaporize and thereby separate the contaminants from the residual solid recoverable material;
    (c) removing the residual solid contaminant-free recoverable material from the resource recovery furnace and employing the recoverable material in the form of raw material for use in cement;
    (d) introducing cement-making constituents into the cement manufacturing furnace;
    (e) combining and supplying the vaporized contaminants along with fuel and combustion air to the cement manufacturing furnace;
    (f) burning said combination in the cement manufacturing furnace to generate a temperature at which the vaporized contaminants are decomposed into an environmentally safe off gas and said constituents are made into cement; and
    (g) discharging the off gas from the cement manufacturing furnace.

2. In a furnace assembly comprising a resource recovery furnace connected to a cement manufacturing furnace, a method of treating solid refuse which includes a mixture of sizes of material, said refuse comprising both recoverable material having determinable vaporization or sublimation temperatures and useful in construction, and contaminants having vaporization temperatures lower than the vaporization or sublimation temperatures of the recoverable material, said method comprising the steps of:
    (a) introducing all of the solid refuse into one end of the resource recovery furnace and causing the refuse to move through the resource recovery furnace toward the other end;
    (b) as the refuse is moved, controlling the temperature of the refuse to above the vaporization temperatures of the contaminants and below the vaporization or sublimation temperature of the recoverable material in order to vaporize and thereby separate the contaminants from the residual solid recoverable material;
    (c) removing the residual solid contaminant-free recoverable material from the resource recovery furnace and employing the recoverable material with portland cement as a base for roads;
    (d) introducing cement-making constituents into the cement manufacturing furnace;
    (e) combining and supplying the vaporized contaminants along with fuel and combustion air to the cement manufacturing furnace;
    (f) burning said combination in the cement manufacturing furnace to generate a temperature at which the vaporized contaminants are decomposed into an environmentally safe off gas and said constituents are made into cement; and
    (g) discharging the off gas from the cement manufacturing furnace.

3. In a furnace assembly comprising a resource recovery furnace connected to a cement manufacturing furnace, a method of treating solid refuse which includes larger particles of polluted material, said refuse comprising both recoverable material having determinable vaporization or sublimation temperatures and useful in construction, and contaminants having vaporization temperatures lower than the vaporization or sublimation temperatures of the recoverable material, said method comprising the steps of:
    (a) introducing all of the solid refuse into one end of the resource recovery furnace and causing the refuse to move through the resource recovery furnace toward the other end;

(b) as the refuse is moved, controlling the temperature of the refuse to above the vaporization temperatures of the contaminants and below the vaporization or sublimation temperature of the recoverable material in order to vaporize and thereby separate the contaminants from the residual solid recoverable material;

(c) removing the residual solid contaminant-free recoverable material from the resource recovery furnace and employing the recoverable material as aggregate in concrete;

(d) introducing cement-making constituents into the cement manufacturing furnace;

(e) combining and supplying the vaporized contaminants along with fuel and combustion air to the cement manufacturing furnace;

(f) burning said combination in the cement manufacturing furnace to generate a temperature at which the vaporized contaminants are decomposed into an environmentally safe off gas and said constituents are made into cement; and (g) discharging the off gas from the cement manufacturing furnace.

4. The method of claim 1, 2 or 3 including the step of controlling the amount of oxygen in the resource recovery furnace in relation to the amount of contaminants in the refuse introduced into said furnace in order that the vaporized contaminants do not undergo complete combustion.

5. The method of claim 1, 2 or 3 including the step of supplying and preheating air in the resource recovery furnace at a temperature of between about 500° F. and about 800° F.

6. The method of claim 1, 2 or 3 including the step of maintaining the hot gases in the resource recovery furnace at a temperature of between about 1,600° F. and about 1,700° F.

7. The method of claim 1, 2 or 3 including the step of maintaining the operating temperature of the cement manufacturing furnace between about 2,700° F. and about 3,000° F.

8. The method of claim 1, 2 or 3, including the step of using the heat energy in the vaporized impurities in heating the cement manufacturing furnace.

9. The method of claim 1, 2 or 3 including the step of maintaining the chamber of the resource recovery furnace at a temperature of about 1,200° F.

10. The method of claim 1, 2 or 3 including the step of cooling the recoverable material during removal from the resource recovery furnace.

* * * * *

UNITED STATES PATENT AND TRADEMARK OFFICE
CERTIFICATE OF CORRECTION

PATENT NO.   :   5,012,751
DATED        :   May 7, 1991
INVENTOR(S)  :   William M. Kirlin It is certified that error appears in the above-identified patent and that said Letters Patent is hereby corrected as shown below:

Column 3, line 43, "remove" should be --removed--;

Column 13, Table XIC, under "Item", "Results" and "Units" headings, delete line 16, and insert:

| | | |
|---|---|---|
| --Total moisture collected | 258.1000 | Milliliters |
| Total moisture collected | 12.1823 | Standard cubic feet-- |

Signed and Sealed this

Eighth Day of December, 1992

Attest:

DOUGLAS B. COMER

*Attesting Officer*      *Acting Commissioner of Patents and Trademarks*